United States Patent [19]

Bürger

[11] Patent Number: 5,477,742

[45] Date of Patent: Dec. 26, 1995

[54] GEAR-SHIFT DEVICE FOR A CHANGE-SPEED GEARBOX OF A MOTOR VEHICLE

[75] Inventor: Hans Bürger, Esslingen, Germany

[73] Assignee: Mercedes-Benz AG, Germany

[21] Appl. No.: 233,756

[22] Filed: Apr. 26, 1994

[30] Foreign Application Priority Data

Apr. 26, 1993 [DE] Germany .......................... 43 13 564.1

[51] Int. Cl.$^6$ ................................................. F16H 61/24
[52] U.S. Cl. ................................................. 74/475; 74/527
[58] Field of Search ......................................... 74/475, 527

[56] References Cited

U.S. PATENT DOCUMENTS

| | | |
|---|---|---|
| 3,164,030 | 1/1965 | Fodrea et al. . |
| 4,070,914 | 1/1978 | Reinhardt et al. .......................... 74/475 |
| 4,275,612 | 6/1981 | Silvester . |
| 4,377,951 | 3/1983 | Magg et al. .............................. 74/475 |
| 4,531,422 | 7/1985 | Yarnell ..................................... 74/475 |
| 4,561,321 | 12/1985 | Yarnell ..................................... 74/475 |
| 4,570,776 | 2/1986 | Iwashita et al. ...................... 192/114 R |
| 5,031,472 | 7/1991 | Dutson et al. ............................ 74/475 |
| 5,038,632 | 8/1991 | Watson .................................... 74/475 |
| 5,109,722 | 5/1992 | Hufnagle et al. ........................ 74/475 |
| 5,140,866 | 8/1992 | Schetter et al. .......................... 74/475 |

FOREIGN PATENT DOCUMENTS 3314411 10/1984 Germany .
3704928 8/1988 Germany .

Primary Examiner—Rodney H. Bonck
Assistant Examiner—David Fenstermacher
Attorney, Agent, or Firm—Evenson, McKeown, Edwards & Lenahan

[57] ABSTRACT

A gear-shift device for a change-speed gear box having a selector shaft that acts via inclined surfaces and reaction balls on a reaction sleeve acted upon by an orientation spring. This arrangement makes it possible to feel a working point when a first shift gate is selected and to allow the spring force to be supported directly on the housing via the reaction balls when a second shift gate is selected.

8 Claims, 5 Drawing Sheets

GEAR-SHIFT DEVICE FOR A CHANGE-SPEED GEARBOX OF A MOTOR VEHICLE

BACKGROUND AND SUMMARY OF THE INVENTION

The present invention relates to a gear-shift device for a change-speed gearbox that has shift gates, comprising a shift-control housing having a geometrical principal axis, and a selector shaft kinematically coupled to a manual-shift lever and supported in an axially displaceable manner in the shift-control housing, coaxially with the principal axis of the shift-control housing. A sleeve-shaped stop part, a pin-shaped stop part, a reaction sleeve and a cylindrical return spring are each arranged coaxially with the principal axis. One of the stop parts is fixed in terms of motion with the selector shaft and the other of said stop parts is fixed in terms of motion with the shift-control housing, and the stop parts are mutually concentric to form an annular space therebetween. At least one reaction ball is provided, with the reaction sleeve, the reaction ball and the return spring being accommodated in the annular space between the mutually concentric stop parts. The sleeve-shaped stop part has a radial guide against which the reaction balls can be brought to rest in a first direction of the principal axis. The reaction sleeve has an inclined surface on a first end against which the reaction balls can be brought to rest in a second direction of the principal axis. The pin-shaped stop part has an axial abutment and the reaction sleeve has a second end used as an axial abutment and is supported by this second end, with the interposition of the return spring, against the axial abutment of the pin-shaped stop part. The pin-shaped stop part has a narrow pin section and a wide pin section, with a transition therebetween, the transition being an inclined surface against which the reaction balls come to rest when the selector shaft is actuated in the direction of the principal axis into one of three positions each assigned to a particular shift gate of the change-speed gearbox. The reaction balls are supported centripetally against the wide pin section after being displaced radially along the inclined surface on the pin-shaped stop part when the selector shaft is actuated into a second position lying adjacent to the first position in the direction of the principal axis, and the reaction sleeve is displaced in the direction of the abutment of the return spring by the reaction balls cooperating with the inclined surface of the reaction sleeve, the abutment of the return spring being fixed in terms of motion relative to the pin-shaped stop part. A third position of the selector shaft lies adjacent to a first position in the direction of the principal axis opposite to the second position.

A known gear-shift device, of the type described above, is shown in U.S. Pat. No. 3,164,030. As seen in FIG. 4 of that patent, the reaction sleeve, which is under a continuous spring force, exerts a force in all positions of the selector shaft, via its inclined surface and the reaction balls, on the pin-shaped stop part connected to the selector shaft in a manner fixed in terms of motion relative to it. This force thus makes itself felt as a resistance at the manual-shift lever even when the shift gate for the reverse gear is not being selected whereas the whole point of the arrangement is to make a working point felt at the manual-shift lever when selecting the shift gate for the reverse gear.

An object of the present invention is, in a gear-shift device of the general type initially described, to avoid the occurrence of unwanted resistances at the manual-shift lever when the shift gate to be marked by a working point is not being selected.

This and other objects are achieved by the present invention which provides a gear-shift device for a change-speed gearbox that has shift gates, comprising a shift-control housing having a geometrical principal axis, and a selector shaft kinematically coupled to a manual-shift lever and supported in an axially displaceable manner in the shift-control housing, coaxially with the principal axis of the shift-control housing. A sleeve-shaped stop part, a pin-shaped stop part, a reaction sleeve and a cylindrical return spring are each arranged coaxially with the principal axis. One of the stop parts is fixed in terms of motion with the selector shaft and the other of said stop parts is fixed in terms of motion with the shift-control housing, and the stop parts are mutually concentric to form an annular space therebetween. At least one reaction ball is provided, with the reaction sleeve, the reaction ball and the return spring being accommodated in the annular space between the mutually concentric stop parts. The sleeve-shaped stop part has a radial guide against which the reaction balls can be brought to rest in a first direction of the principal axis. The reaction sleeve has an inclined surface on a first end against which the reaction balls can be brought to rest in a second direction of the principal axis. The pin-shaped stop part has an axial abutment and the reaction sleeve has a second end used as an axial abutment and is supported by this second end, with the interposition of the return spring, against the axial abutment of the pin-shaped stop part. The pin-shaped stop part has a narrow pin section and a wide pin section, with a transition therebetween, the transition being an inclined surface against which the reaction balls come to rest when the selector shaft is actuated in the direction of the principal axis into one of three positions each assigned to a particular shift gate of the change-speed gearbox. The reaction balls are supported centripetally against the wide pin section after being displaced radially along the inclined surface on the pin-shaped stop part when the selector shaft is actuated into a second position lying adjacent to the first position in the direction of the principal axis, and the reaction sleeve is displaced in the direction of the abutment of the return spring by the reaction balls cooperating with the inclined surface of the reaction sleeve, the abutment of the return spring being fixed in terms of motion relative to the pin-shaped stop part. A third position of the selector shaft lies adjacent to a first position in the direction of the principal axis opposite to the second position. The reaction sleeve has an axial stop for contact with the radial guide and the radial guide has a corresponding stop, and the two stops rest against one another when the selector shaft is in that region of the principal axis which is defined by the first position and the third position.

In the gear-shift device according to the invention, the spring force of the return spring is introduced into the sleeve-shaped stop part via the stops of the reaction sleeve and the radial guide when the selector shaft is actuated in the region of the principal axis defined by the second and third position, the reaction balls being bypassed.

This advantageous effect of the stops of the reaction sleeve and the radial guide as regards the freedom from forces of the reaction balls is also maintained in the further development of the gear-shift device according to the present invention in accordance with certain embodiments in which the return spring is used as a centering spring for an unactuated rest position of the selector shaft, for which a third position assigned to a particular shift gate and adjacent to the first position can be provided.

While it does lie within the scope of the invention for the reaction sleeve to have a stop surface for its contact with the radial guide in addition to its inclined surface, the inclined surface in accordance with the embodiment of the gear-shift device according to the invention in accordance with certain embodiment is additionally used as the stop surface.

If, in the gear-shift device according to the invention, the axial stop of the narrow pin section is, according to certain embodiments, designed as an inclined surface to define the third position of the selector shaft, and consequently the line of action of force in the supporting of the spring force is not parallel to the principal axis, it is possible to keep the differences in the diameters of the sleeve-shaped and the pin-shaped stop part small. In the gear-shift device according to the invention, a particularly advantageous path of force from the inclined surface on the reaction sleeve to the inclined surface of the narrow pin section via the reaction balls is achieved in accordance with certain embodiments of the invention.

In an embodiment of the gear-shift device according to the invention which is advantageous as regards the production of the radial guide with the associated inclined stop surface for the reaction sleeve, a guide ring is provided.

In the gear-shift device according to the invention, coordination to achieve freedom of movement for the reaction balls is made possible in accordance with certain embodiments of the present invention.

In the gear-shift device according to the invention, a configuration which is advantageous particularly as regards the adjustability of the stops or abutments on the housing is achieved by certain embodiments of the invention.

Other objects, advantages and novel features of the present invention will become apparent from the following detailed description of the invention when considered in conjunction with the accompanying drawings.

BRIEF DESCRIPTION OF THE DRAWINGS

FIG. 1a shows the detail A from FIG. 1 on an enlarged scale.

DETAILED DESCRIPTION OF THE DRAWINGS

Figure 1:
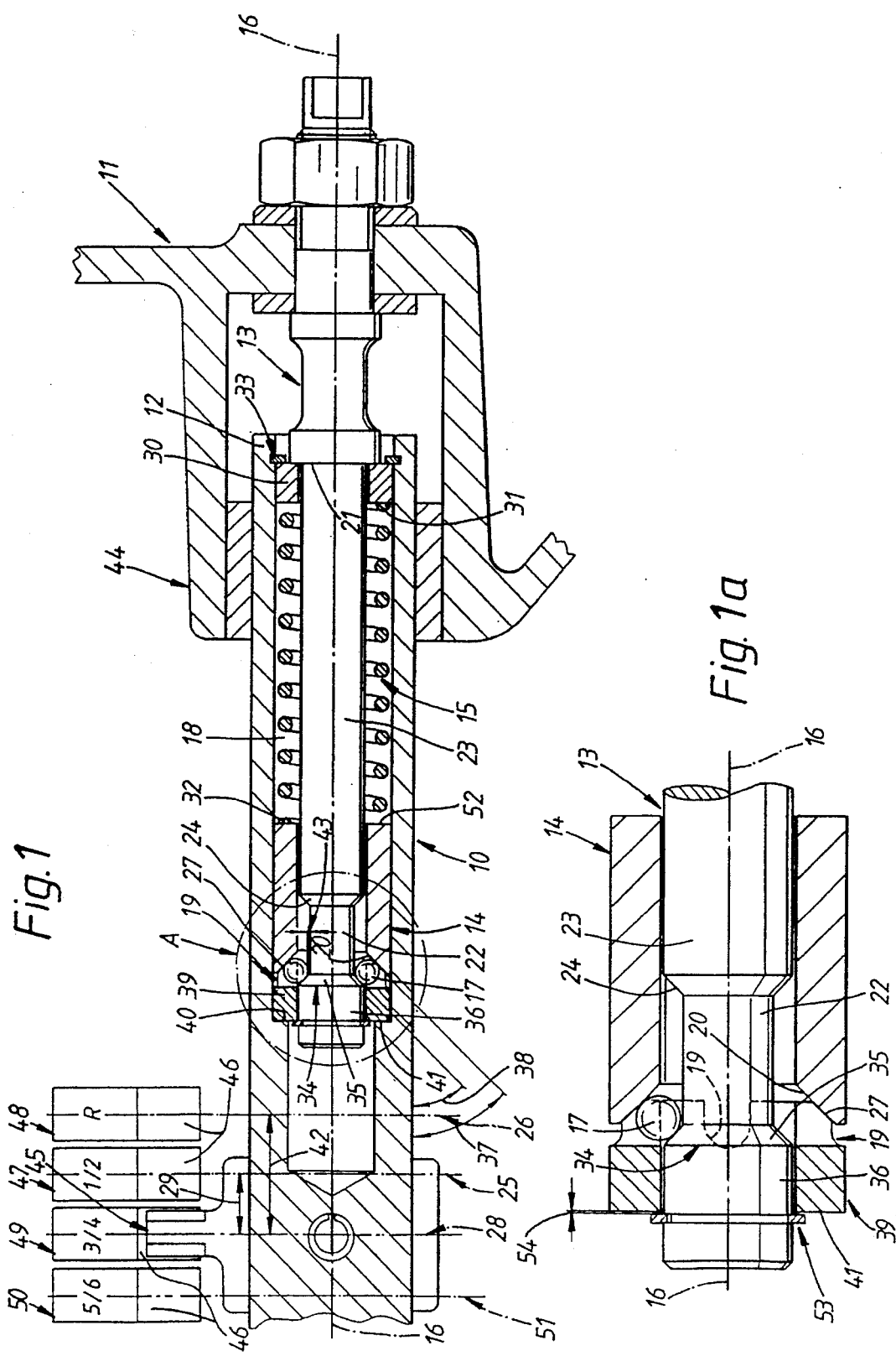
FIG. 1 shows a partial longitudinal section through a gear-shift device constructed according to an embodiment of the invention, in which only those details which are required for an understanding of the invention are illustrated.

In a shift-control housing 11 which forms the upper part of a gearbox casing of a change-speed gearbox and can be of integral construction with the latter, a selector shaft 10 is supported at each of its ends by a respective bearing arrangement 44 in a manner which allows it to be rotated and displaced axially in relation to a geometrical principal axis 16—16 of the gearbox casing. The other end of the selector shaft 10, which is not shown, passes through the shift-control housing 11 to the outside and is coupled kinematically in a known manner to a manual-shift lever in such a way that the selector shaft 10 is displaced axially by the selecting movements of the manual-shift lever and rotated by the gear-change movements of the manual-shift lever. In its central section, the selector shaft 10 is provided in the customary manner with a selector finger 45, fixed in terms of movement relative to it, which, in the respective shift gate of the manual-shift lever, engages in articulated fashion in a coupling groove 46 of one of four selector rods 47, 48, 49, 50.

In relation to the principal axis 16—16, the selector shaft 10 in FIG. 1 is in a rest position maintained by a centering spring 15. In this rest position the selector finger 45 engages in the coupling groove 46 of the selector rod 49 for the selection of the third and fourth forward gears, this position elsewhere being referred to and described as a third position 28 of the selector shaft 10.

Figure 2:
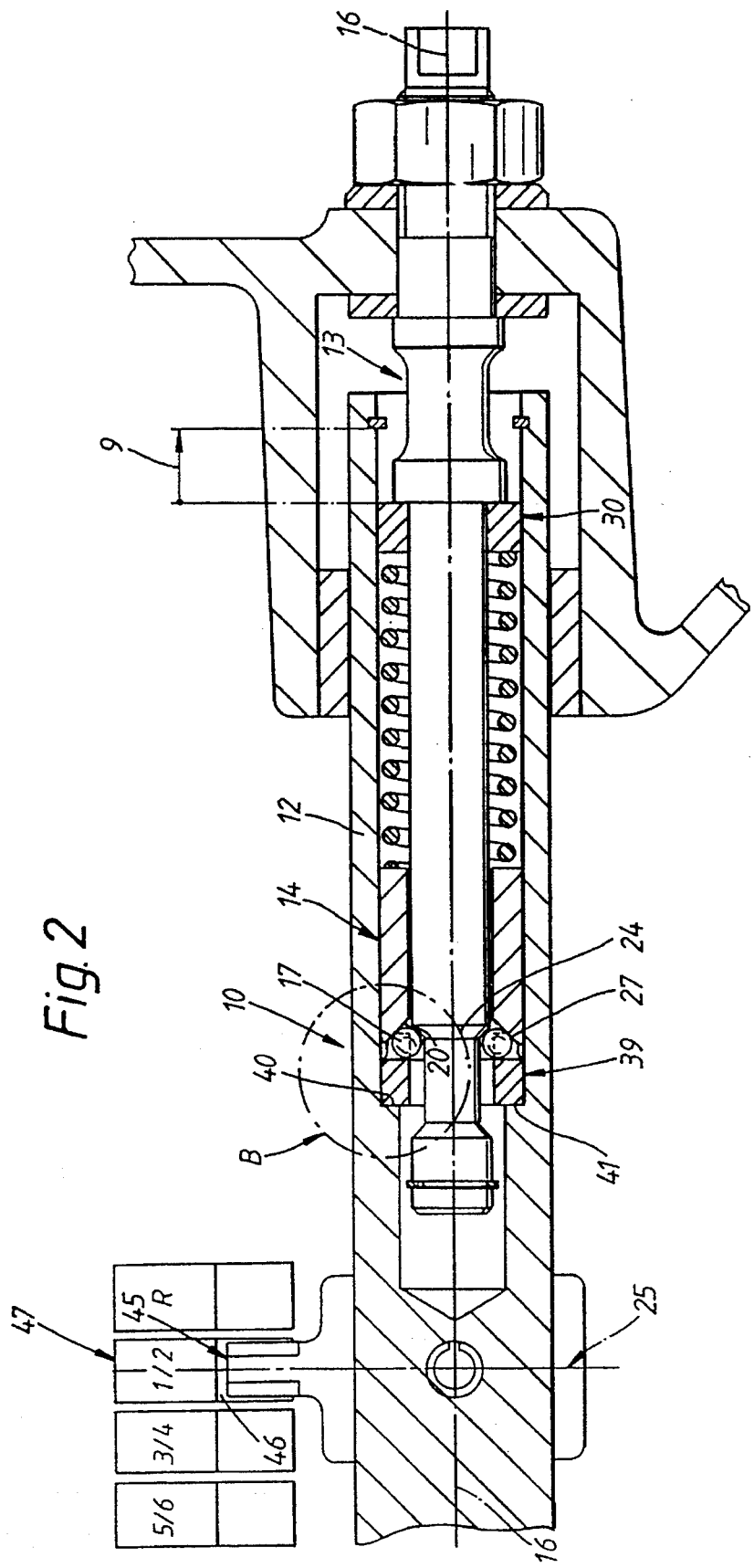
FIG. 2 shows a section corresponding to that in FIG. 1 through the gear-shift device, which has been actuated into a position described as a first position.

In relation to the principal axis 16—16, the selector shaft 10 has, in FIG. 2, been actuated into a first position 25, in which its selector finger 45 engages in the coupling groove 46 of the selector rod 47 used to select the first and the second forward gear.

Figure 3:
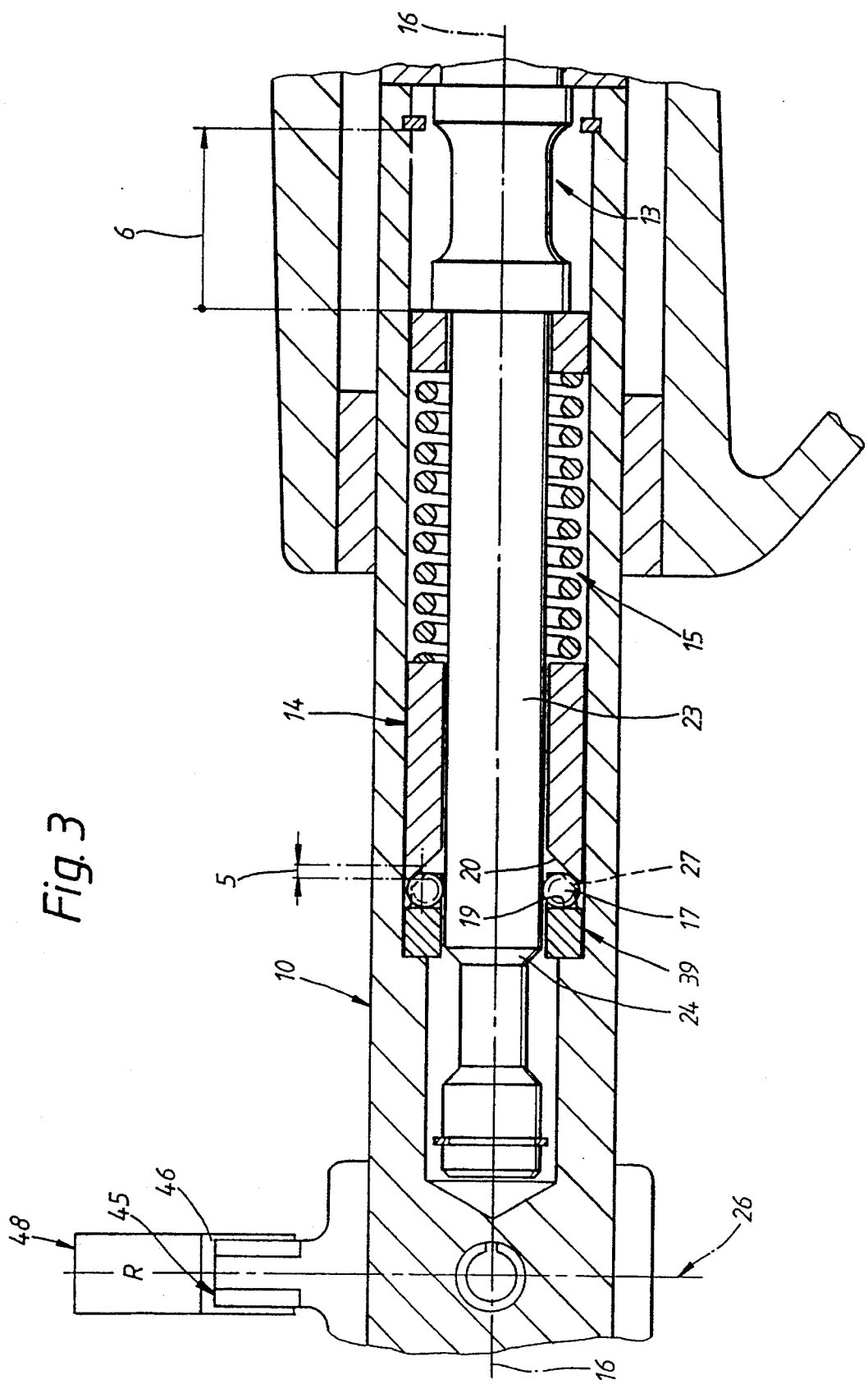
FIG. 3 shows a section corresponding to that in FIG. 1 through the gear-shift device, which has been actuated into a position described as a second position.

In relation to the principal axis 16—16, the selector shaft 10 has, in FIG. 3, been actuated into a second position 26, in which its selector finger 45 engages in the coupling groove 46 of the selector rod 48 used to select the reverse gear.

Figure 4:
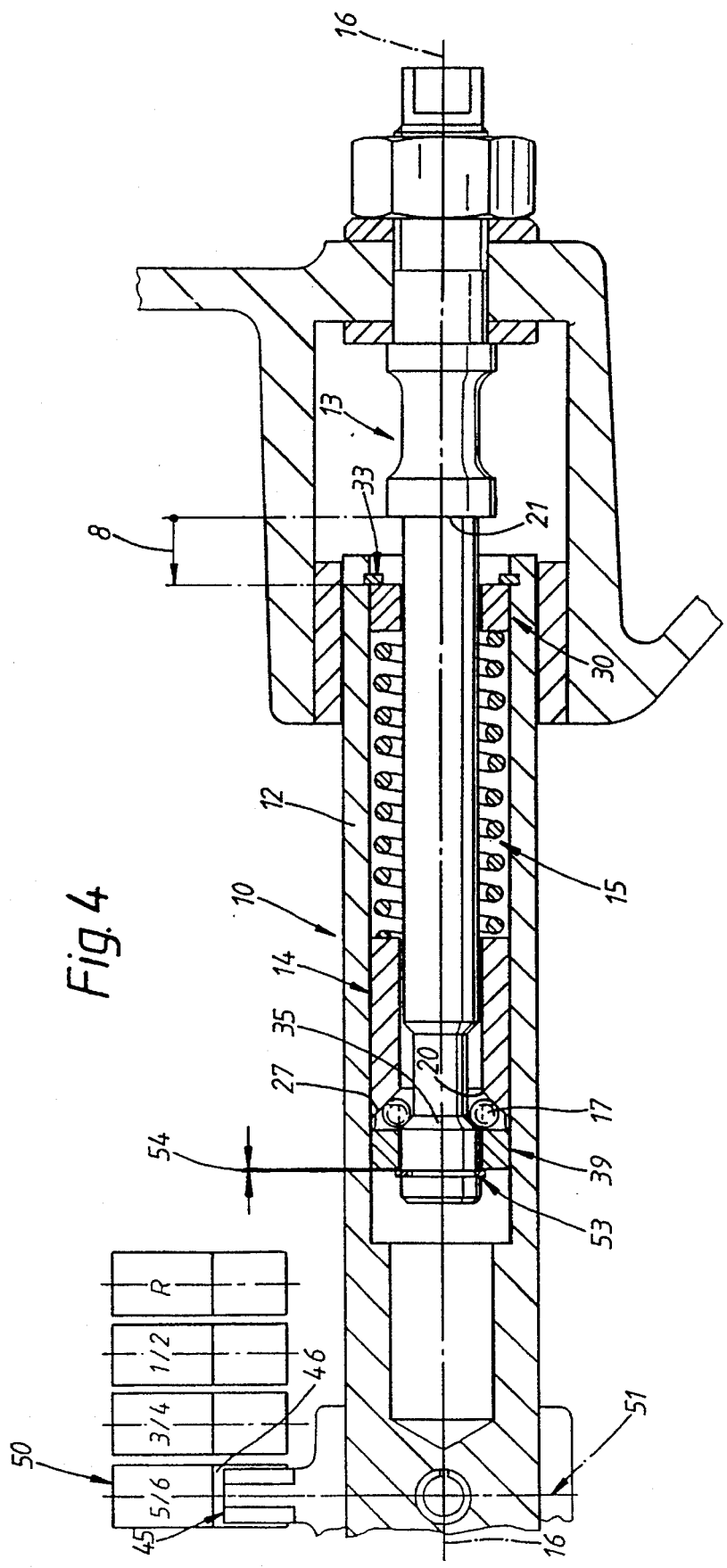
FIG. 4 shows a section corresponding to that in FIG. 1 through the gear-shift device, which has been actuated into a position described as a fourth position.

In relation to the principal axis 16—16, the selector shaft 10 has, in FIG. 4, been actuated into a fourth position 51, in which its selector finger 45 engages in the coupling groove 46 of the selector rod 50 used to select a fifth and a sixth forward gear. The selector rods 47, 48, 49, 50, each of which is illustrated in cross-section, are supported in a manner which allows them to be displaced in a plane of the shift-control housing 11 parallel to the principal axis 16—16 and perpendicular to the plane of the drawing and are kinematically coupled in a known manner, by means of an associated selector fork, to the gear wheel clutch for coupling the freely revolving gear of the gear stage assigned to the associated speed.

The end of the selector shaft 10 which is supported in the bearing arrangement 44 shown is designed as a sleeve-shaped stop part 12 into which there projects (forming a free annular space 18) a pin-shaped stop part 13 which is fixed coaxially with the principal axis 16—16 and in a manner fixed in terms of movement relative to the shift-control housing 11.

Arranged in the annular space 18, in the following sequence—in relation to the first direction of the principal axis 16—16, that from the second position 26 of the selector shaft 10 to the first position 25 of the selector shaft 10—are a centering ring 30, a cylindrical return or centering spring 15, a reaction sleeve 14, a plurality of reaction balls 17 and a guide ring 39.

The pin-shaped stop part 13 has a narrow pin section 22, which, in the second direction of the principal axis 16—16, merges via an inclined surface 24 into a first wide pin section 23 and, in the first direction of the principal axis 16—16, merges via an inclined surface 35 into a second wide pin section 36.

In the unactuated condition of the gear-shift device, that shown in FIG. 1, the centering spring 15 is under prestress. Under the action of the prestress, the end 31 of the spring 15 remote from the reaction sleeve 14 is supported via the centering ring 30 both against a radial step 21 of the pin-shaped stop part 13, which step is used as an abutment fixed in relation to the housing, and against a retaining ring 33 used as an abutment that is fixed in relation to the selector shaft 10 and inserted into an inner circumferential groove in the sleeve-shaped stop part 12. The centering spring 15 is supported by its other end 32 against the adjacent end of the reaction sleeve 14, which is used as a spring stop 52. The other end of the reaction sleeve 14 is designed as a tapered inclined surface 20 which opens in the first direction of the principal axis 16—16 and by means of which the reaction sleeve 14 engages, under the action of the spring prestress, on the reaction balls 17. During this process, this reaction balls 17 are supported against the inclined surface 35 of the pin-shaped stop part 13. This inclined surface 35 is thus used as an axial abutment 34, fixed in relation to the housing 11, for the support of the spring force of the centering spring 15 in the first direction of the principal axis 16—16. In this arrangement, the angle 37 of inclination of the inclined surface 20 on the reaction sleeve 14 is equal to or somewhat smaller than the angle 38 of inclination of the inclined surface 35 on the pin-shaped stop part 13 and, as a result, the reaction balls 17 are reliably pressed against the inclined surface 35 of the pin-shaped stop part 13 by the spring force and cannot travel radially outwards onto the circumference of the wide pin section 36.

Under the circumstances described above, the guide ring 39 is free of forces in the unactuated condition of the gear-shift device, as can clearly be seen in detail from FIG. 1a. According to this figure, the guide ring 39 has respective radial guides 19 to support the reaction balls 17 axially in the first direction of the principal axis 16—16. To provide mutual support in the directions of the principal axis 16—16, the reaction sleeve 14 and the guide ring 39 furthermore each have a corresponding stop on their adjacent ends. The illustrative embodiment shown provides for the additional use of the inclined surface 20, which per se cooperates with the reaction balls 17, as the axial stop of the reaction sleeve 14 and for the formation of a corresponding inclined surface 27 on the guide ring 39 as an axial stop. These stops 20, 27 are used to virtually bridge the reaction balls 17, i.e. keep them free of forces, during the actuation of the selector shaft 10 in the region 29 of the principal axis 16—16 defined by the first position 25 and the third position 28 illustrated. When, in accordance with FIG. 2, the selector shaft 10 is displaced in the second direction of the principal axis 16—16 from the third position 28 into the second position 25, a radial step, used as axial stop 40, on the inner circumference of the sleeve-shaped stop part 12 comes to rest against the supporting surface of the guide ring 39, the surface remote from the reaction sleeve 14, which is used as corresponding stop 41. The result is that the spring force of the centering spring 15, which, during this process, is compressed by the selector shaft displacement 9, is transmitted to the selector shaft 10 by the reaction sleeve 14 via the stops 20, 27 and 40, 41, bypassing the reaction balls 17. In the rest position 28 illustrated, however, there is such a large clearance between the inclined surface 20 of the reaction sleeve 14 and the stop surface 40 on the sleeve-shaped stop part 12 in the directions of the principal axis 16—16 that the guide ring 39 still has a certain axial play relative to these two parts 12 and 14 and is thus free of forces.

Thus, when, in accordance with FIG. 4, the selector shaft 10 is displaced in the first direction of the principal axis 16—16 from the third position 28 (rest position) into the position 51, by the selector shaft displacement 8, a process involving further compression of the centering spring 15, the reaction sleeve 14 and the reaction balls 17 remain in their position (shown in FIGS. 1 and 1a) relative to the inclined surface 35 of the pin-shaped stop part 13. There is per se no reason why the position of the guide ring 39 in the directions of the principal axis 16—16 should change during this process either. Purely for reasons of safety and assembly, however, a retaining ring 53 is inserted into a circumferential groove in the wide pin section 36. This prevents the guide ring 39, which has radial play relative to the wide pin section 36 and axial play 54 relative to the retaining ring 53, from being stripped off when the selector shaft 10 is actuated into the fourth position 51 for the selection of the fifth or sixth gear.

Figure 2A:
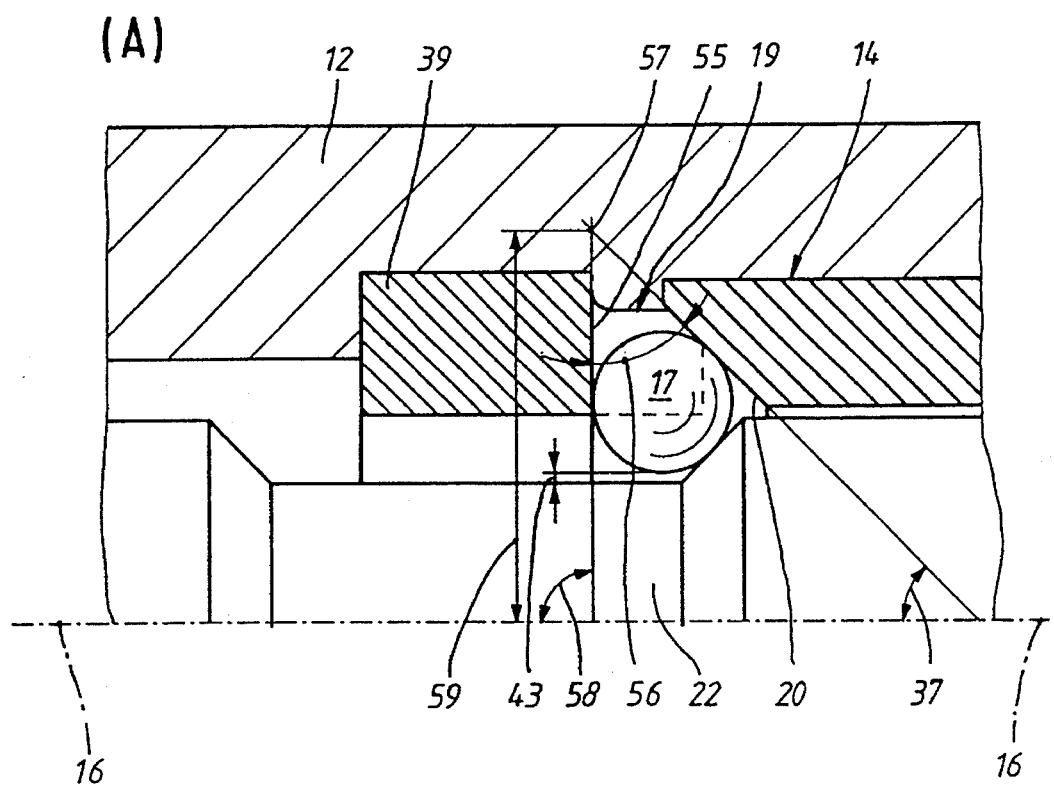
FIG. 2a shows the detail B in FIG. 2 on an enlarged scale.

As seen in FIG. 2a, the supporting edge 55 of the radial guide 19 supporting the respective reaction ball 17 in the first direction of the principal axis 16—16, encloses an angle 56 of inclination with the inclined surface 20 of the reaction sleeve 14, the angle 58 between the supporting edge 55 and the principal axis 16—16 not necessarily being 90°.

The reaction balls 17 have a radial play 43, relative to the narrow pin section 22. This radial play 43 is ensured by matching the clearance 59 between the vertex 57 of the angle 56 of inclination, on the one hand, and the principal axis 16—16 on the other—if the angle 37 of inclination of the inclined surface 20 is determined by the chosen magnitude of the gear-changing forces—to the diameters of the pin section 22 and of the reaction ball 17. This keeps the reaction ball 17 free of forces when the selector shaft 10 is actuated in that region 29 of the principal axis 16—16 which is defined by positions 25 and 28. The larger this clearance 59, the larger the play 43 because a larger clearance results, in turn, in an increase in the axial clearance between the supporting edge 55 and the inclined surface 20, allowing the reaction ball 17 to drift radially outwards somewhat.

When, in accordance with FIG. 2, the selector shaft 10 is actuated into the first position 25 for the selection of the first or second gear, the reaction balls 17 are in the vicinity of or still in force-free contact with the inclined surface 24 of the pin-shaped stop part 13.

When the selector shaft 10 is actuated into the second position 26 for the selection of the reverse gear in accordance with FIG. 3 and, in the process, is displaced by the selector shaft travel 6 relative to the rest position 28, the reaction balls 17 are displaced radially outwards along the inclined surface 24. As a result, the reaction balls 17 are supported centripetally against the wide pin section 23 of the pin-shaped stop part 13 and, supported axially against their radial guide 19, additionally displace the reaction sleeve 14 by an axial differential displacement 5 relative to the selector shaft 10. This differential displacement 5 thus compresses the centering spring 15 to a greater extent than would correspond to the selector shaft displacement 6 and, like the force required to displace the reaction balls 17, this makes itself felt as a working point at the manual-shift lever.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A gear-shift device for a change-speed gearbox that has shift gates, comprising:

a shift-control housing having a geometrical principal axis;

a selector shaft kinematically coupled to a manual-shift lever and supported in an axially displaceable manner in the shift-control housing, coaxially with the principal axis of the shift-control housing;

a sleeve-shaped stop part, a pin-shaped stop part, a reaction sleeve and a cylindrical return spring which are each arranged coaxially with the principal axis, and in which one of said stop parts is fixed in terms of motion with the selector shaft and the other of said stop parts is fixed in terms of motion with the shift-control housing, wherein the stop parts are mutually concentric to form an annular space therebetween;

at least one reaction ball, with the reaction sleeve, the at least one reaction ball and the return spring being accommodated in the annular space between the mutually concentric stop parts;

wherein the sleeve-shaped stop part has a radial guide against which the at least one reaction ball can be brought to rest in a first direction of the principal axis;

wherein the reaction sleeve has an inclined surface on a first end against which the at least one reaction ball can be brought to rest in a second direction of the principal axis;

wherein the pin-shaped stop part has an axial abutment and the reaction sleeve has a second end used as an axial abutment and is supported by this second end, with the interposition of the return spring, against the axial abutment of the pin-shaped stop part;

wherein the pin-shaped stop part has a narrow pin section and a wide pin section, with a transition therebetween, the transition being an inclined surface against which the at least one reaction ball comes to rest when the selector shaft is actuated in the direction of the principal axis into one of three positions each assigned to a particular shift gate of the change-speed gearbox;

wherein the at least one reaction ball is supported centripetally against the wide pin section after being displaced radially along the inclined surface on the pin-shaped stop part when the selector shaft is actuated into a second position lying adjacent to the first position in the direction of the principal axis, and the reaction sleeve is displaced in the direction of the abutment of the return spring by the at least one reaction ball cooperating with the inclined surface of the reaction sleeve, the abutment of the return spring being fixed in terms of motion relative to the pin-shaped stop part;

wherein a third position of the selector shaft lies adjacent to a first position in the direction of the principal axis opposite to the second position;

wherein the reaction sleeve has an axial stop for contact with the radial guide and the radial guide has a corresponding stop, and wherein the two stops rest against one another when the selector shaft is in a region of the principal axis defined by the first position and the third position.

2. The gear-shift device according to claim 1, further comprising a centering ring arranged within the annular space, concentrically between the sleeve-shaped stop part and the pin-shaped stop part, and so as to be movable axially relative to the sleeved-shaped stop part and is supportable in the second direction of the principal axis against the abutment of the return spring, the abutment of the return spring being fixed in terms of motion relative to the pin-shaped stop part, and in the first direction of the principal axis against the end of the return spring remote from the reaction sleeve, wherein the sleeve-shaped stop part has an axial abutment for supporting the centering ring in the second direction of the principal axis and the narrow pin section has an axial stop for supporting the reaction balls in the first direction of the principal axis, and wherein in the third position of the selector shaft the return spring is under prestress and the centering ring is supported against the associated abutments of the two stop parts, and the reaction balls are supported against the stop of the narrow pin section.

3. The gear-shift device according to claim 2, further comprising an inclined surface at the transition to a second, wide pin section of the pin shaped stop part is used for the axial stop on the narrow pin section.

4. The gear-shift device according to claim 3, wherein an angle of inclination of the inclined surface of the reaction sleeve is at most equal to an angle of inclination of the inclined surface on the narrow pin section used as a stop for the third position of the selector shaft.

5. The gear-shift device according to claim 1, wherein the inclined surface of the reaction sleeve forms a stop for the contact with the radial guide, and the stop of the radial guide has a corresponding inclined surface.

6. The gear-shift device according to claim 1, further comprising a guide ring having the radial guide and which is accommodated in the annular space so as to be movable in the directions of the principal axis relative to the sleeve-shaped and pin-shaped stop parts and, in that the sleeve-shaped stop part has an axial stop for the purpose of supporting the guide ring in the first direction of the principal axis and the guide ring has a corresponding stop, wherein the axial and corresponding stops rest against one another when the selector shaft is actuated in a second region of the principal axis defined by the second position and the third position.

7. The gear-shift device according to claim 1, wherein the radial guide has a supporting edge that supports the respective reaction ball in the first direction of the principal axis, encloses with the inclined surface of the reaction sleeve an angle of inclination, the vertex of which is arranged at such a distance from the principal axis that the reaction ball has a radial play relative to the narrow pin section when the selector shaft is actuated in a second region of the principal axis defined by the first position and the third position.

8. The gear-shift device according to claim 1, wherein the pin-shaped stop part is fixed in terms of motion relative to the shift control housing.

* * * * *